US008959438B2

(12) United States Patent
Wiltzius et al.

(10) Patent No.: US 8,959,438 B2
(45) Date of Patent: Feb. 17, 2015

(54) MEDIA CONTROL PANE IN BROWSER

(75) Inventors: Thomas Christian Wiltzius, Santa Barbara, CA (US); Kathryn Cushing, San Francisco, CA (US); Gideon Wald, San Francisco, CA (US); Gregory Matthew Marra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/605,940

(22) Filed: Sep. 6, 2012

(65) Prior Publication Data
US 2014/0068440 A1 Mar. 6, 2014

(51) Int. Cl.
G06F 3/16 (2006.01)
(52) U.S. Cl.
USPC ............ 715/727; 715/777; 715/716; 715/779
(58) Field of Classification Search
USPC ........................... 715/727, 779, 753, 777, 716
See application file for complete search history.

(56) References Cited

U.S. PATENT DOCUMENTS

| 2002/0113812 | A1* | 8/2002 | Walker et al. ............... 345/719 |
| 2003/0103079 | A1 | 6/2003 | Adatia et al. |
| 2004/0268261 | A1 | 12/2004 | Elliott |
| 2005/0021624 | A1* | 1/2005 | Herf et al. ................ 709/204 |
| 2011/0113337 | A1 | 5/2011 | Liu et al. |
| 2012/0066635 | A1 | 3/2012 | Kim et al. |
| 2012/0102414 | A1 | 4/2012 | Demant et al. |

OTHER PUBLICATIONS

PCT International Search Report and Written Opinion of the ISA/EPO issued in the International Application No. PCT/US2013/043475, European Patent Office, Aug. 22, 2013.

* cited by examiner

Primary Examiner — Kieu Vu
Assistant Examiner — Joy M Weber
(74) Attorney, Agent, or Firm — Morris & Kamlay LLP

(57) ABSTRACT

Methods, systems and computer programs are presented for generating media tabs for playing media files of various websites or applications. One method includes detecting a selected website through a browser and scanning the selected website to identify media files. For identified media files in the selected website, the method creates a media tab for association with the browser. The method generates a unified set of media controls for the media tab, where the unified set of media controls is mapped to native controls of the selected website having the media files. The method provides tab rendering data for the media tab. The tab rendering data is configured for associating the media tab with the browser. The tab rendering data, when associated with the browser, enables input at the media tab to be communicated to selected ones of the native controls, without accessing the native controls at the selected website.

23 Claims, 7 Drawing Sheets

MEDIA CONTROL PANE IN BROWSER

BACKGROUND

The present invention relates generally to browsing and using the Internet, and more particularly, to methods and systems for managing audio files in a browser application Internet applications have grown tremendously over the years and so has the functionality provided to devices that access such applications. In the field of music, such internet applications provide various levels of access and features. Providers of such applications have also developed various business models for providing access to such music (e.g., media), and differing user interfaces for controlling the selection and listening features. Each of the user interfaces typically has some common features that allow browsing, selecting, playing, rewind, fast-forward, pause functions, etc. In addition, depending on the provider, other custom functions are provided in their interfaces.

Commonly, an individual user may wish to access more than one provider service (e.g., website) through multiple internet browsing windows. This would allow the user to switch between the providers based on content changes or new availability of particular music. By way of example, a user may be listening to a media on a first website, that media is interrupted by a commercial or possibly another media that the user doesn't wish to listen to, and so the user selects a second website and a second media to listen to on that second website. At this point, the user will have two different individualized user interfaces to manage during the listening session.

These multiple individualized user interfaces require multiple pages, tabs, or windows in the browser and each may have individualized controls. The controls might be similar in function but are typically arranged in a different order, having different shaped buttons, having similar shaped buttons with different functions and many other user interface issues that make it less user-friendly to use the multiple user interfaces.

In addition, the user may not recall which browser tab or window is currently playing the media, or the user may wish to navigate back to the browser tab or window that is actually playing the media in order to select another media file, stop or pause or some other playback control. Thus, it may be very cumbersome to stop play in a first tab or window then start play in a second tab or window. The lack of a standard mechanism for controlling media play from a browser makes accessing and controlling the various media websites overly complex and generally not user friendly.

It is in this context that embodiments arise.

SUMMARY

Broadly speaking, the present invention fills these needs by providing a simplified user interface for accessing multiple sources of media files. It should be appreciated that the present invention can be implemented in numerous ways, including as a process, an apparatus, a system, computer readable media, or a device. Several inventive embodiments of the present invention are described below.

In one embodiment, a method includes detecting navigation to a selected website through a browser and scanning the selected website to identify media files. For identified media files in the selected website, the method creates a media tab for association with the browser. The method generates a unified set of media controls for the media tab, where the unified set of media controls is mapped to native controls of the selected website having the media files. The method provides tab rendering data for the media tab. The tab rendering data is configured for associating the media tab with the browser. The tab rendering data, when associated with the browser, enables input at the media tab to be communicated to selected ones of the native controls, without accessing the native controls at the selected website.

In one embodiment, the selection of a website can be user defined, instead of automatic detection of navigation to a website. For instance, a user may navigate to certain websites that he or she knows have media files (e.g., are music containing sites), and then trigger the generation of the media tab for only those websites. The method would then scan only those websites that the user identifies, which avoids having the method scan every single website being visited.

In some embodiments, methods, systems and computer programs are presented for media playback including a device capable of running an Internet browser. The Internet browser includes program instructions for enabling navigation to a selected website and program instructions for creating a new media tab for media available on the selected website. The new media tab includes program instructions for linking media controls from the selected website to a simplified set of media controls in the new media tab.

These and other embodiments can include one or more of the following features. The simplified set of media controls in the new media tab can be included in a browser window of the Internet browser. The new media tab can be displayed as a reduced tab in the browser window. The new media tab can include multiple new tabs, where each one of the new tabs can be displayed as a reduced tab in the browser window. An active tab of the multiple new tabs can be highlighted. Selecting the new media tab can expand the media tab to display the simplified set of media controls in the browser window. The simplified set of media controls can include a display for metadata corresponding to a selected media file currently being controlled by the simplified set of media controls. The Internet browser can also include a social network client, including a sender and a receiver for a sharing of a selected media file currently being controlled by the simplified set of media controls.

In some embodiments, methods, systems for media playback include navigating to a selected website and creating a new media tab for media available on the selected website. The new media tab can link media controls from the selected website to a simplified set of media controls in the new media tab. Linking media controls from the selected website to the simplified set of media controls in the new media tab can include creating media controls for a media file in the selected website.

In some embodiments, methods, systems and computer readable media having program instructions are presented for media playback. The program instructions enable navigation to multiple websites, and enable creation of one or more new media tab for media available on a corresponding one of the websites. Each one of the new media tabs are associated with program instructions for linking media controls from the corresponding website to a simplified set of media controls in the corresponding new media tab. The simplified set of media controls in the each of the new media tabs is displayed as a reduced tab in the Internet browser window, and an active tab of the new tabs is highlighted. The simplified set of media controls include a display for metadata corresponding to a selected media file currently being controlled by the simplified set of media controls.

In another embodiment, a method for generating media interfaces for playing media files of various applications is disclosed. The method includes creating a media interface upon detecting access of to an application having media files. Then, generating a unified set of media controls for the media interface. The unified set of media controls are mapped to native controls of the application. Input at the media interface is communicated to selected ones of the native controls without accessing the native controls of the application, and the method is executed by a processor. In one example, additional media interfaces are created in the form of user interface tabs, upon detecting accesses to additional applications. For instance, as more applications are opened (and open applications remain active), additional interface tabs are provided. The applications can be, for example, for portable smartphone devices, tablet computers, laptops, desktops, or any other computing device or display screen.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1A:
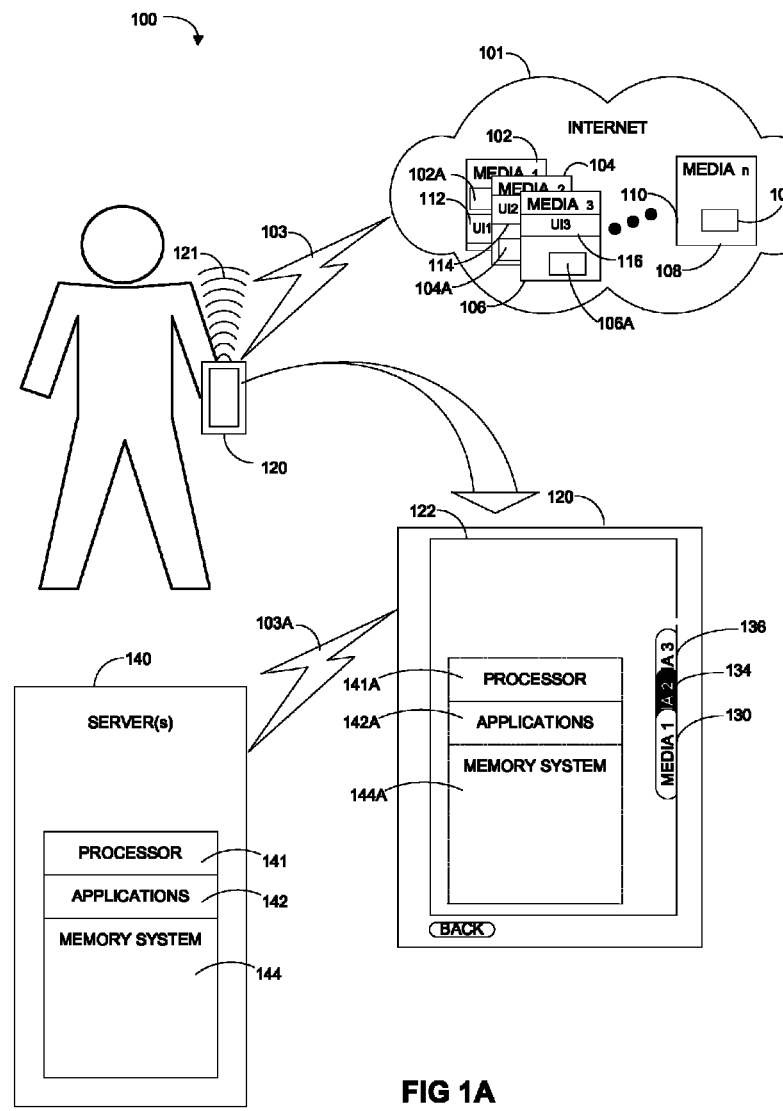
FIG. 1A is a schematic diagram of a playback media system, in accordance with an embodiment of the present invention.

Several exemplary embodiments for a simplified user interface system and method for accessing multiple sources of media files will now be described. It will be apparent to those skilled in the art that the present invention may be practiced without some or all of the specific details set forth herein.

A simplified user interface system and method for accessing multiple sources of media files can be included in an Internet browser application. The browser application or plug-in can control media playback from various sources, such as local device storage and storage of providers connected to the Internet. In one embodiment, the browser can provide media status information and controls for the user. These controls and information can be displayed in many forms e.g., a side pane in the browser window, a media bar, a static media bar, a dynamic media bar, pop-out controls, etc. The controls and information may include identification of the currently playing media file, display of any available metadata corresponding to the media file, and playback controls: e.g.: pause, fast-forward, rewind, select next/previous media file, etc. In one embodiment, when provided as a side pane, the media controls may be displayed on every webpage or selectively, e.g. on web pages with media content. The content sources for the side panel may, in one embodiment, be populated with data from any open tabs or windows that provide media files for playback. A tab can be represented as a media interface. The media interface can be enabled as a user interface icon, link, selection, etc. In general, the tab can take on various forms to provide user interface via a display.

For purposes of example, media (e.g., media files) may be obtained or accessed from various sources. One type of media may be simple embedded media files, e.g., MP3 files, linked to or associated with a webpage. In this case, the browser can simply scan the page and locate this embedded media content. The process of scanning can include examination of the website data, files associated with the website data, and any markup code associated with the website. Although MP3 files are provided as an example, it should be understood that there are many types of media file formats, both proprietary and open. All of these media file formats can, of course, be identified by scanning content of a webpage and if necessary, appropriate players or codecs can be used to provide access or identification thereof.

Another type of main media source can include, for instance, media that is served by internet accessible applications. Such applications, in one embodiment, store music on internet storage (e.g., cloud storage), and users are able to access their accounts to listen, control, add, delete, and share music. Commonly, such media sources provide their custom playback features as embedded controls, which are part of the self-contained application. For such applications, access to identify controls for playback, etc., would necessitate access to an application programming interface (API) of the media provider. In some embodiments, the API for accessing controls, retrieving information, or posting data is facilitated by an API that is open for such purpose. In such cases, the provider's website would accept API calls from other applications, browsers, plug-ins, code, etc., which would then return media file information and control parameters. The media file information and control parameters, in one embodiment, would be usable by the browser to display metadata regarding the media being played and display controls usable to triggering changes to rendering at the Internet application. In this example, it is possible to obtain media play status, controls, etc., and render such information on a separate browser control interface (e.g., media control pane or tabs).

In another embodiment, the browser or plug-in code can login to the media source, map the controls and provide status to the browser control interface. The login, for example, may be requested of the user once, when setup is performed for the browser control interface, and once setup, the browser control interface may sync with the media source. In this manner, it is possible for users with various accounts from different providers, to seamlessly interface with those accounts through a single media control interface.

In one embodiment, different tabs of a browser (or integrated with a browser as a plug-in), may provide music content that can be represented as a source in a media control pane. The media control pane can provide the ability to switch media sources in response to received or detected user input. User input can be provided by touch input, mouse clicks, stylus input, gesture input, voice input, or combinations thereof. The media control pane can be in-page, rendered as a floating frame, or assigned to a particular space of the screen or display. The media control pane can be integrated into any commercially available browser. And, as noted, the integration can be in the form of a custom integration or can be provided as an add-on plugin module. In another embodiment, the integration can be presented in a toolbar, which can be rendered to the side, top, bottom, etc. of the browser window.

It should therefore be understood that the media control pane can be rendered in any number of ways, so that the functionality can be presented to a user. And, as user selection or control is received, the media control pane can render the integrated functionality. In still another embodiment, the media control pane may also reside in its own window, that is separate from a browser. The separate window can be moved or placed in any location on the screen or can be tied or controlled through a menu provided by an operating system.

Still further, the method can also be employed in non-website centric environments, such as those that use an application (APP) model. In an application model, users may open applications on their devices, similar to navigating to websites. As user open applications, media interfaces may be created for controlling the media files associated with the opened application. If an application that is opened does not have media files (e.g., no music, no video, etc.), then no media interface is created for those applications. As applications are opened and some remain open, e.g., not closed and may be active in the background, additional media interfaces (e.g., tabs) can be added. As applications are closed or no longer in use, those tabs can be removed. The tabs can also be rendered in a hiding format, such that they only show themselves when user access is detected (e.g., by a slide-out, slide-in method). In one example, additional media interfaces are created in the form of user interface tabs, upon detecting accesses to additional applications. For instance, as more applications are opened (and open applications remain active), additional interface tabs are provided. The applications can be, for example, for portable smartphone devices, tablet computers, laptops, desktops, or any other computing device or display screen.

FIG. 1A is a schematic diagram of a playback media system 100, in accordance with an embodiment of the present invention. The playback media system 100 includes a user device 120. The user device 120 is linked to one or more networks by a network link 103. One of the networks can be the Internet 101.

The Internet 101 includes multiple websites 102, 104, 106, and 108 providing playback media. Each of the multiple websites 102, 104 and 106 include a corresponding user interface 112, 114 and 116 for accessing and controlling the corresponding playback media 102A, 104A and 106A. Website 108 includes playback media 108A but does not include a corresponding user interface for accessing and controlling the playback media.

The user device 120 can be a portable or handheld device such as a smartphone or a PDA or a tablet computer or a laptop or a dedicated media player such as an Internet "radio". The user device 120 can also be a desktop computer. The user device 120 can also be any other device capable of operating a browser e.g. an Internet enabled set top box, television, refrigerator, etc.

The user device 120 can be coupled to a server 140 by network link 103A. The server 140 can include one or more processors 141, applications 142 and a memory system 144 capable of running the simplified media playback control system described in more detail herein.

Additionally or alternatively, the user device 120 can include one or more processors 141A, applications 142A and a memory system 144A capable of running the simplified media playback control system described in more detail herein. The user device 120 also includes a display 122. The display 122 can display one or more browser windows. The simplified media playback control system can be displayed as tabs 130, 134 and 136 along a side of the display 122. The tabs are selectable by user input, to allow switching between the various media sources, and further allow control of the selected media source directly from the simplified media control system.

Figure 1B:
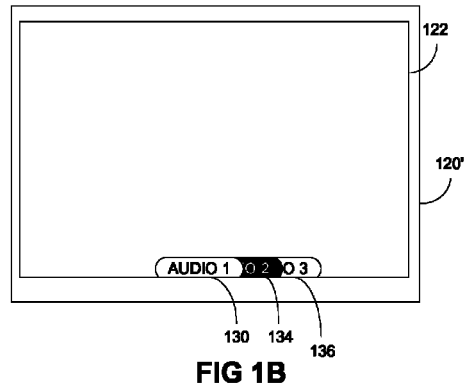
FIG. 1B shows a tablet computer, in accordance with an embodiment of the present invention.

FIG. 1B shows a tablet computer 120', in accordance with an embodiment of the present invention. The tablet computer 120' may display one or more browser windows in the display 122. In one embodiment, the simplified media playback control system can be displayed, for example, as tabs 130, 134 and 136 along a bottom of the display 122.

Figure 1C:
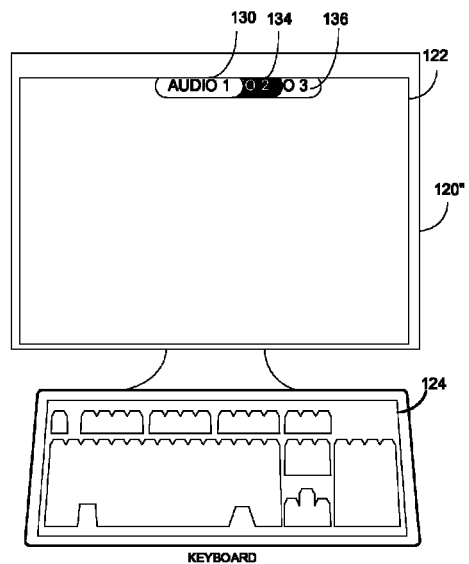
FIG. 1C shows a desktop computer, in accordance with an embodiment of the present invention.

FIG. 1C shows a desktop computer 120" and keyboard 124, in accordance with an embodiment of the present invention. The desktop computer 120" may display one or more browser windows in the display 122. In this embodiment, the simplified media playback control system can be displayed, for example, as tabs 130, 134 and 136 along a top of the display 122.

Figure 2A:
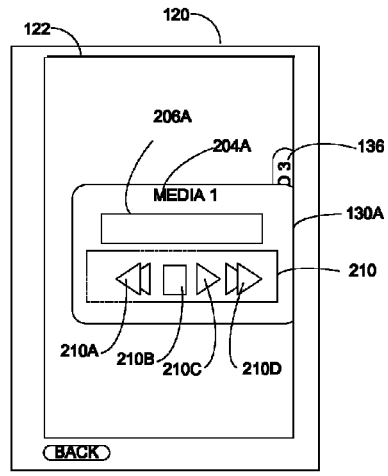
FIGS. 2A-2C are displays of screens of the simplified media playback control system, in accordance with an embodiment of the present invention.
Figure 2B:
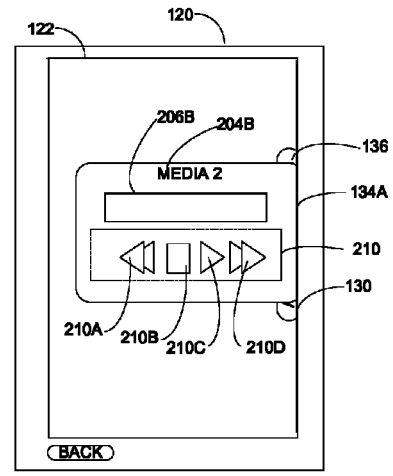
Figure 2C:
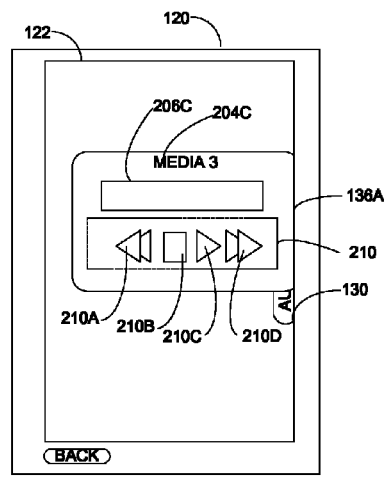

FIGS. 2A-2C are displays of screens of the simplified media playback control system 200, in accordance with an embodiment of the present invention. The display screens are generated by code of the simplified media playback control system 200. As noted above, the content displayed in each of the media sections 204A-204C depend on the content detected in each of the corresponding websites, in which the media content originated. The code of the simplified media playback control system may then display metadata concerning the identified media content, provide control buttons, etc., as if the user had been directly accessing the controls of the individual websites. In one embodiment, the controls presented in each of the tabs 130 are presented in a same format, no matter the format of the originating website. As such, the user is able to provide input in the same unified manner, for each media source. In one embodiment, selecting tab 130, as shown in FIG. 1A, causes simplified control inputs 210 and information 130A, 134A, 136A to be displayed. For example, the simplified control inputs 210 may include a stop or pause button 210B, a play button 210C, a rewind button 210A, and a fast-forward button 210D. As noted, the controls listed herein are merely examples and many other types of controls such as media file selection controls, metadata display controls, media images controls (i.e., image displays for music titles), exit controls, and other controls may be included as part of the simplified control inputs. The simplified control inputs 210 are simplified because they are substantially the same for every corresponding website or other media file source e.g., locally stored media.

As noted above, the simplified control inputs 210 and information 130A, 134A, 136A can include a label 204A identifying the current media file and a metadata display 206A, 206B, 206C that can display metadata corresponding to the current media file. Similar to expanding tab 136 as shown in FIG. 2A, FIGS. 2B and 2C show expanding corresponding tabs 130 and 136.

Figure 3:
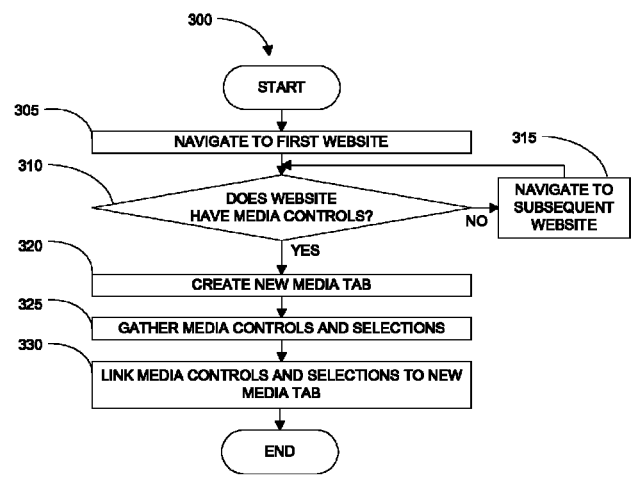
FIG. 3 is a flowchart diagram that illustrates the method operations performed in creating a media tab, in accordance with one embodiment of the present invention.

FIG. 3 is a flowchart diagram that illustrates the method operations 300 performed in creating a media tab, in accordance with one embodiment of the present invention. The operations illustrated herein are by way of example, as it should be understood that some operations may have sub-operations and in other instances, certain operations described herein may not be included in the illustrated operations. With this in mind, the method and operations 300 will now be described.

In an operation 305, the browser is navigated to the first website. For websites that include media files in an operation 310, operations for identifying the media files and identifying the native controls of the website are performed. For example, the media files present on a website may be stored in an index file that includes metadata or identifiers associated with each media file (e.g., song, album, video clip, etc.). The index can also be associated with one or more playlists created by the user. The playlists can identify certain media files that are categorized by the user based on likes or types. Thus, the identifying is a process by which the content of the website, metadata of the website or storage of the website can be examined to identify the media files. The website can also be queried or scanned to identify the controls associated with the identified media files. As noted above, the controls can include standard play, skip, pause, stop, etc., or custom controls. Once the identification of the media files is complete, the method operations continue in operation 320.

In an operation 320, a new media tab is created. Creation of the media tab may include, for example, identification of a set of controls and display parameters for the tabs. The set of controls, in one embodiment, may include defining a fixed set of controls, so that the controls of every tab can be unified. The controls identified for the tabs, in one embodiment, may be based on the identification of available controls from the native website that contained the media files, or based on a set of minimum controls that would normally be included in the native website. The identification and definition of the controls of the tab, however, set the unified set so that users can easily select different tabs (i.e., to access different sources), and then provide user control in the same manner for every source mapped to the tabs.

In an operation 325, the media controls of the selected websites are identified and gathered. For example, for each website that the user wishes to add to a tab, the media controls are mapped to the tabs. In operation 330, the media controls for the selected websites (or sources) are linked to the simplified control inputs. In one embodiment, the addition of a source to a tab can be done based on user selection, and in another embodiment, code can automatically identify if sources (i.e., websites) include media that can be added, and tabs can be offered to the user for addition. The user can then accept to add tabs or not. In still another embodiment, the tab options can be collected and then later offered to the user as options to add as active tabs. For example, the browser can include a history button that displays available tabs, which can be selectively added, based on prior website navigation. Still further, if a selected website does not include media controls, but does include media files that can be played back, then media controls can be created for a new tab based on the media file in the selected website.

If in operation 310, the selected website does not include any media files then the method operations continue in operation 315 where a subsequent website is selected and the method operations continue in operation 310.

Figure 4:
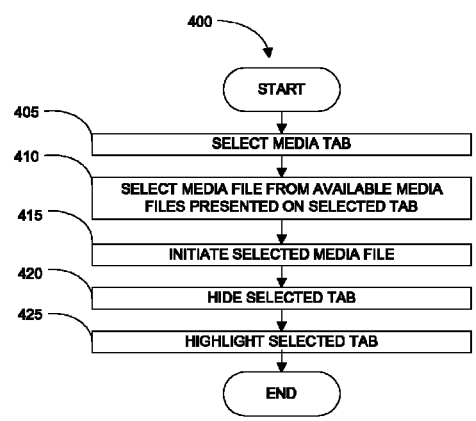
FIG. 4 is a flowchart diagram that illustrates the method operations performed in using the simplified control inputs and information, in accordance with one embodiment of the present invention.

FIG. 4 is a flowchart diagram that illustrates the method operations 400 performed in using the simplified control inputs and information, in accordance with one embodiment of the present invention. The operations illustrated herein are by way of example, as it should be understood that some operations may have sub-operations and in other instances, certain operations described herein may not be included in the illustrated operations. With this in mind, the method and operations 400 will now be described.

Referring to FIGS. 2A and 4, in an operation 405, a media tab is selected. A media tab 130, 134, 136 can be selected by touching the media tab in a touchscreen device, or navigating to the media tab with any other suitable pointing device e.g. mouse or track-pad, etc.

In operation 410, the media file is selected from available media files presented in the selected media tab 130, 134, 136. In operation 415, the desired control input for the selected media file is applied. The simplified control inputs can be operated by touching, tapping, or otherwise selecting the corresponding button 210A-D. As noted above, the one or more media tabs are configured to present controls in a unified form. In this manner, no matter the originating source of the media files, the control interface will be the same for each of the tabs, which facilitates switching between sources and easy identification and interfacing with like controls. The controls provided by the tabs, in one embodiment, may be mapped to the native controls of the originating website, without requiring the user to access the originating website. For example, as controls are selected at the tabs, the control input is translated and communicated to the originating website to effect the desired input. The play of the audio, however, is rendered to the user's device via the tabs as if the user were directly accessing the originating website. The noted switching, in one embodiment, will allow a user to move between tabs, select songs (media), set controls, and switch again to another tab. If play is selected in one tab, and the user selects a second tab where play is selected, the audio from the second tab is rendered, while pausing or stopping play in the first tab. If the user moves back to the first tab, the state of the song or control may, in one embodiment, be held so the user can resume listing from that point. Thus, the tab navigation provides a seamless mechanism for moving from source to source using easily selectable tabs, and effecting control of each source of a tab in the same unified manner.

In an operation 420, the media tab may be minimized or hidden back to as displayed in FIG. 1A, by any number of mechanisms including double-clicking or on a touchscreen device a swipe or a tap of a fingertip or stylus. Minimizing is, in one embodiment optional, but such minimizing will reduce clutter on the screen, while providing for easy access and switching between tabs when desired by the user.

In an optional operation 425, a media tab 130, 134, 136 can be highlighted to identify that a media file is currently being played back. The tab can then be selected to access the controls. For instance, if the user is conducting other internet accesses using a browser, the user may later wish to return to the audio controls provided by the tab. The user may wish to fast-forward, pause, etc., and by providing a highlighting indicator, the user will know which tab is the currently active tab. It should be understood that other methods for highlighting a tab can be provided. Other examples may include, for instance, flashing the tab icon, changing the color of the tab, changing the text contrast, changing the shading, etc. In another embodiment, a media tab 130, 134, 136 can become highlighted automatically to signify that the media file or files of the source are no longer available, or some other control issue requires the user's attention. The highlighting may be provided in the form, for example, as a grayed out tab icon, etc.

Figure 5:
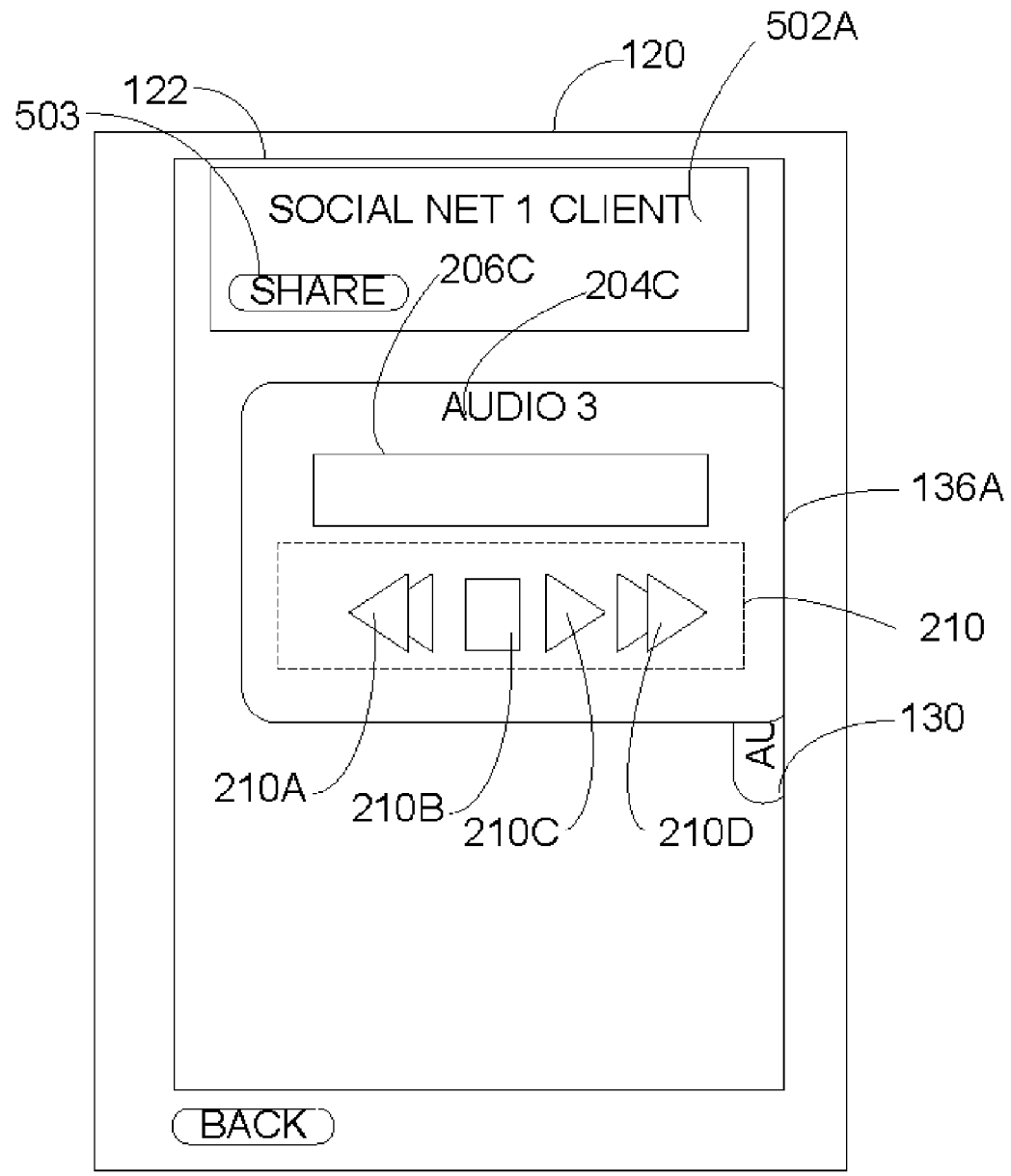
FIG. 5 shows a system of sharing a media selection across a social media service, in accordance with an embodiment of the present invention.
Figure 6:
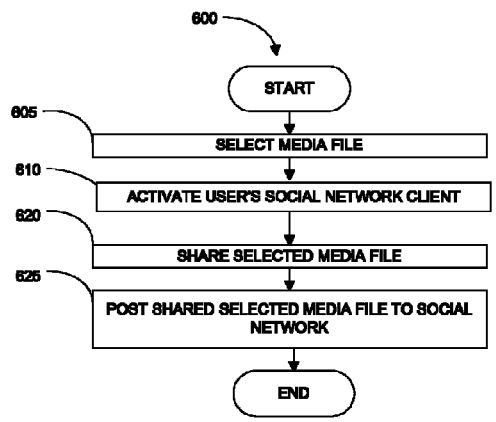
FIG. 6 is a flowchart diagram that illustrates the method operations performed in sharing a selected media file, in accordance with one embodiment of the present invention.

In one embodiment, the code that renders the tabs with unified controls can also integrate with social networking controls. The social networking controls may enable sharing of likes, dislikes, comments, opinions, etc., which may relate to music being rendered through one of the tabs. FIG. 5 shows a system of sharing a media selection across a social media service, in accordance with an embodiment of the present invention. FIG. 6 is a flowchart diagram that illustrates the method operations 600 performed in sharing a selected media file, in accordance with one embodiment of the present invention. The operations illustrated herein are by way of example, as it should be understood that some operations may have sub-operations and in other instances, certain operations described herein may not be included in the illustrated operations. With this in mind, the method and operations 600 will now be described.

The user device 120, includes a social network client 502A. The social network client 502A includes a share button 503. In an operation 605, a media file is selected with a media tab 130. The social network client 502A connects the user to the user's selected social network in operation 610.

In operation 620, selecting the share button 503 may, at 625, post a message to the user's social network that the user is currently listening to the selected media file or possibly that the user prefers or likes or promotes the selected media file. Still referring to FIG. 5, the social network may include functionality to post information to only selected friends of the user. For example, the user may wish to share posts regarding music listened to from tab 1 (i.e., corresponding to a first media source) with a first set of friends, and share music listened to from tab 2 (i.e., corresponding to a second media source) with a second set of friends. The associating of tabs to certain groups of friends can be set through an interface of the expanded tab (not shown), or can be set at the social networking site as preferences.

Figure 7:
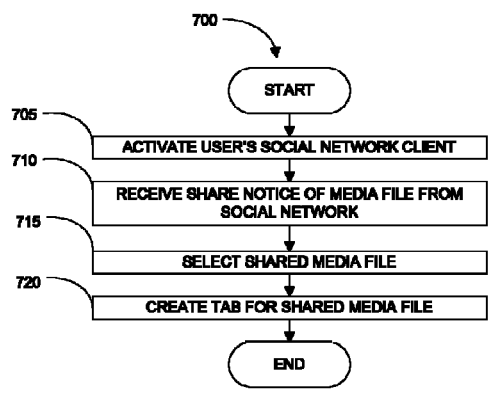
FIG. 7 is a flowchart diagram that illustrates the method operations performed in receiving a shared media file, in accordance with one embodiment of the present invention.

FIG. 7 is a flowchart diagram that illustrates the method operations 700 performed in receiving a shared media file, in accordance with one embodiment of the present invention. The operations illustrated herein are by way of example, as it should be understood that some operations may have sub-operations and in other instances, certain operations described herein may not be included in the illustrated operations. With this in mind, the method and operations 700 will now be described.

In an operation 705, the social network client 502A connects the user to the user's selected social network. Connection to the social networking client can include, for example, signing in with a user name and password. Once signed in, the user can perform one or more social related actions. The actions can be, for example, assigning groups of friends to certain ones of the tabs that may be defined by a user during a session. In another embodiment, the tabs (e.g., definition data) can be saved in storage on the local device or on network storage. Thus, if the user logs-off during a browsing session, the user can then reactivate the previously defined tabs during any later initiated sessions. The tab definition data can also be communicated or shared with a social network, and this would allow the user to make the assignments of the particular tabs to particular circles of friends of his or her social network.

In an operation 710, a media file or data regarding play of the media file can be shared with someone in the user's social network. The shared information, which may be a post can, as an example, be: "User B is listening to Song A", "User A likes playing Song C from source X every Friday night", "Friend B thinks that Source X has great music", "User A is playing Song A again! He loves this tune."

In another embodiment, in operation 710, the sharing can be an invitation to a friend to join a sharing session of particular media. For example, if the user is listening to certain music from one of the tabs, the user may send a share request to a friend in his social network, and the friend may be able to connect or access the same tab on their device. The share request would be, for example, for the selected shared media file or files associate with the tab, in operation 715. In one embodiment, the tab can also be created 720 on the friend's device (e.g., instances on each of the devices participating in the share), and the friend can listen to the same music or music source. In this embodiment, any one of the connected friends can access the controls provided by the tabs. If one friend wishes to skip one of the songs, the other friend will likewise skip the song, as they would be listening to the same session (e.g., shared tabs). In still another embodiment, a tab can control or create playlists. If a playlist created for a tab, that tab and associated playlist can be shared socially, either directly to a friend or to groups of friends in a network.

In summary, the embodiments have been described with reference to a "tab" that is linked to a particular media source, whether stored locally or in cloud storage. The format of the interface, however, is not limited to a tab, and any user interface, graphic, control, screen frame, or input that can be rendered on a display is possible. The input, however, is designed to provide access to the media from the source and further provide for controls for rendering the media. The controls will allow for play of the media, sharing of the media, etc., and each of the inputs (tabs) will include unified controls, such that interfacing with various disparate sources (e.g., websites that have media or locally stored media) will occur in substantially the same manner. Further, the inputs (e.g., tabs) will be designed to enable users to easily switch between inputs (e.g., tabs shown in FIGS. 1A-1C). Still further, although examples have described with reference to music files, the files can also be video or other types of multimedia files. If video is provided, the expanded media tabs (e.g., shown in FIGS. 2A-2C) will include the form factor for showing video, in addition to providing the unified controls. The unified interface may also include the sharing feature for socializing directly in the expanded media tabs, or as options that are selectable from menus, pull-downs, etc. that may be associated with or integrated with the expanded media tabs.

Figure 8:
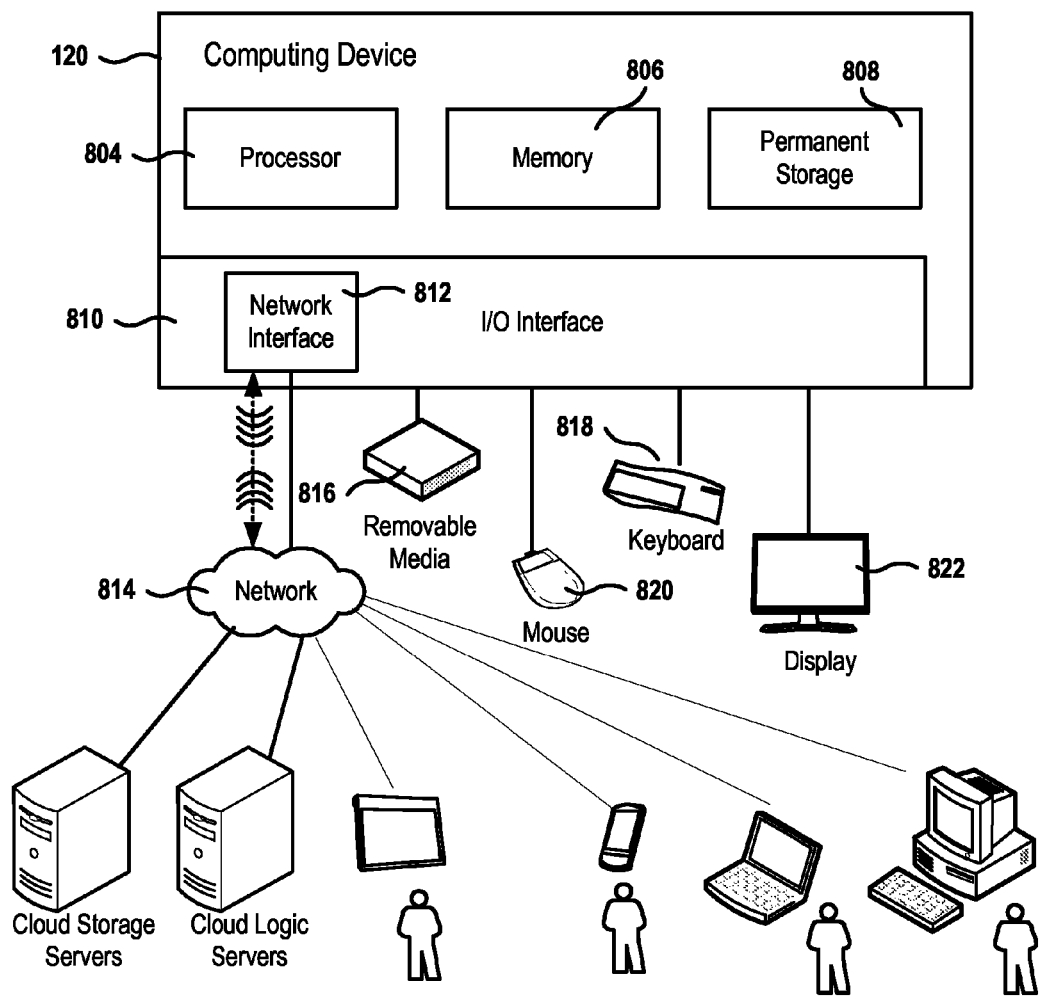
FIG. 8 is a simplified schematic diagram of a computer system for implementing embodiments of the present invention.

FIG. 8 is a simplified schematic diagram of a computer system 120 for implementing embodiments of the present invention. FIG. 8 depicts an exemplary computer environment for implementing embodiments of the invention. It should be appreciated that the methods described herein may be performed with a digital processing system, e.g., a conventional, general-purpose computer system. Special purpose computers, which are designed or programmed to perform only one function, may be used in the alternative. The computer system 120 includes a processor 804, which is coupled through a bus to memory 806, permanent storage 808, and Input/Output (I/O) interface 810.

Permanent storage 808 represents a persistent data storage device e.g., a hard drive or a USB drive, which may be local or remote. Network interface 812 provides connections via network 814, allowing communications (wired or wireless) with other devices. It should be appreciated that processor 804 may be embodied in a general-purpose processor, a special purpose processor, or a specially programmed logic device. Input/Output (I/O) interface 810 provides communication with different peripherals and is connected with processor 804, memory 806, and permanent storage 808, through the bus. Sample peripherals include display 822, keyboard 818, mouse 820, removable media device 816, etc.

Display 822 is configured to display the user interfaces described herein. Keyboard 818, mouse 820, removable media device 816, and other peripherals are coupled to I/O interface 810 in order to exchange information with processor 804. It should be appreciated that data to and from external devices may be communicated through I/O interface 810. Embodiments of the invention can also be practiced in distributed computing environments where tasks are performed by remote processing devices that are linked through a wired or a wireless network.

Embodiments of the present invention can be fabricated as computer readable code on a non-transitory computer readable storage medium. The non-transitory computer readable storage medium holds data which can be read by a computer system. Examples of the non-transitory computer readable storage medium include permanent storage 808, network attached storage (NAS), read-only memory or random-access memory in memory module 806, Compact Discs (CD), Blu-ray™ discs, flash drives, hard drives, magnetic tapes, and other data storage devices. The non-transitory computer readable storage medium may be distributed over a network coupled computer system so that the computer readable code is stored and executed in a distributed fashion.

Additionally, FIG. 8 shows various types of devices that can connect to the network, e.g., the internet. The devices include servers, tablet computers, smartphones, laptops, desktops, etc. The various devices and run operating systems and the operating systems can vary from manufacturer to manufacturer.

Some, or all operations of the method presented herein are executed through a processor, e.g., processor 804 of FIG. 8. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating media interfaces for playing media files of various applications, comprising:
    detecting access of a first application on a first webpage having a first plurality of media files and a second application on a second webpage having a second plurality of media files, wherein the first webpage is shown in a web browser in a first tab and the second webpage is shown in the web browser in a second tab;
    generating an abbreviated media interface comprising a first audio tab corresponding to the first webpage and a second audio tab corresponding to the second webpage, wherein the first audio tab and second audio tab appear contiguous with one another and are distinct from the first tab and the second tab of the web browser;
    receiving a selection of the first audio tab;
    responsive to the selection of the first audio tab, expanding the first audio tab to display a media interface with a unified set of media controls that are mapped to native controls of the first application;
    receiving, by the media interface, an input to control the first plurality of media files; and
    communicating the input to the first application, wherein the first application responds to the input as though the input were received by the native controls of the first application, the method being executed by a processor.

2. The method of claim 1, further comprising, creating additional media interfaces in a form of user interface tabs upon detecting access to additional applications.

3. The method of claim 2, wherein media interfaces are removed from the user interface tabs upon detecting closing of applications.

4. The method of claim 2, wherein each of the user interface tabs share the unified set of media controls.

5. A method for generating audio tabs for playing media files of various websites, comprising:
    detecting navigation to a first selected website and a second website through a browser, wherein the first website is displayed in a first tab of the browser and the second website is displayed in a second tab of the browser;
    scanning the first selected website and the second website to identify a first media files corresponding to the first selected website and a second media files corresponding to the second selected website;
    generating an abbreviated media interface comprising a first audio tab corresponding to the first media files and a second audio tab corresponding to the second media files, wherein the first audio tab and second audio tab appear contiguous with one another and are distinct from the first tab and the second tab of the browser;
    receiving a selection of the first audio tab;
    responsive to the selection of the first audio tab, expanding the first audio tab to display a media interface with
    a unified set of media controls for the media interface that are mapped to native controls of the first selected website having the first media files;
    receiving, by the media interface, an input to control the first media files; and
    communicating the input to the native controls of the first selected website, without accessing the native controls at the first selected website, the method being executed by a processor.

6. The method of claim 5, further comprising:
    continuing to detect navigation to additional selected websites, and for each additional website, scanning the selected website to identify media files, and for each additional selected websites having media files generating the unified set of media controls for each respective additional audio tabs, wherein each of the additional audio tabs has associated tab rendering data.

7. The method of claim 6, wherein the browser, when associated with the audio tab and one or more additional audio tabs, renders the audio tab and the additional audio tabs to enable switching between the audio tab and the additional audio tabs.

8. The method of claim 7, wherein switching between audio tabs is in response to detected user input, and each tab is associated with media files of the selected websites, each selected website being a media source having one or more media files.

9. The method of claim 8, wherein the switching between audio tabs provides rendering the unified set of media controls for each tab, the unified set of media controls for each tab being substantially the same.

10. The method of claim 6, wherein each of the media tabs is configurable with a highlighting indicator, the highlighting indicator identifying which of the audio tabs is an active tab.

11. The method of claim 6, wherein the unified set of media controls include a metadata display for rendering data regarding media files of the audio tabs.

12. The method of claim 6, wherein the unified set of media controls includes a social networking control, the social networking control enabling sharing data regarding activity with the audio tab and the additional audio tabs with friends of a social network.

13. The method of claim 12, wherein the social networking control enables sharing of media files or one of the audio tabs during a session.

14. A non-transitory computer readable media having program instructions for generating media tabs for playing media files of various websites, the computer readable media comprising:
program instructions for detecting navigation to a first selected website and a second website through a browser, wherein the first website is displayed in a first tab of the browser and the second website is displayed in a second tab of the browser;
program instructions for scanning the first selected website and the second website to identify a first media files corresponding to the first selected website and a second media files corresponding to the second selected website;
generating an abbreviated media interface comprising a first audio tab corresponding to the first media files and a second audio tab corresponding to the second media files, wherein the first audio tab and second audio tab appear contiguous with one another and are distinct from the first tab and the second tab of the browser;
receiving a selection of the first audio tab;
responsive to the selection of the first audio tab, program instructions for expanding the first audio tab to display a media interface with
a unified set of media controls for the media interface that are mapped to native controls of the first selected website having the first media files;
program instructions for receiving, by the media interface, an input to control the first media files; and
program instructions for communicating the input to the native controls of the first selected website, without accessing the native controls at the first selected website.

15. The non-transitory computer readable media of claim 14, further comprising:
program instructions for continuing to detect navigation to additional selected websites, and for each additional website, scanning the selected website to identify media files, and for the each additional selected websites having media files generating the unified set of media controls for each respective additional audio tabs,
wherein each of the additional audio tabs has associated tab rendering data.

16. The non-transitory computer readable media of claim 15, wherein the browser, when associated with the audio tab and one or more additional audio tabs, includes program instructions for rendering the audio tab and the one or more additional audio tabs to enable switching between the audio tab and the one or more additional audio tabs.

17. The non-transitory computer readable media of claim 15, wherein switching between the audio tab and the additional audio tabs is in response to detected user input, and each audio tab is associated with media files of the additional selected websites, each selected website being a media source having one or more media files.

18. The non-transitory computer readable media of claim 17, wherein the switching between the audio tab and the additional audio tabs provides rendering the unified set of media controls for each tab, the unified set of media controls for each tab being substantially the same.

19. The non-transitory computer readable media of claim 15, wherein each of the media tabs is configurable with a highlighting indicator, the highlighting indicator identifying which of the respective additional audio tabs is an active tab.

20. The non-transitory computer readable media of claim 15, wherein the unified set of media controls include a metadata display for rendering data regarding media files of the audio tabs.

21. The non-transitory computer readable media of claim 15, wherein the unified set of media controls includes a social networking control, the social networking control enabling sharing data regarding activity with the audio tab and the additional audio tabs with friends of a social network, and the social networking control enables sharing of media files or one of the audio tabs during a session.

22. A system for generating audio tabs for playing media files of various websites, comprising:
a server for detecting navigation to a first selected website and a second website through a browser, wherein the first website is displayed in a first tab of the browser and the second website is displayed in a second tab of the browser, and causing scanning the first selected website and the second website to identify a first media files corresponding to the first selected website and a second media files corresponding to the second selected website, generating an abbreviated media interface comprising a first audio tab corresponding to the first media files and a second audio tab corresponding to the second media files, wherein the first audio tab and second audio tab appear contiguous with one another and are distinct from the first tab and the second tab of the browser; receiving a selection of the first audio tab; responsive to the selection of the first audio tab, expanding the first audio tab to display a media interface with a unified set of media controls for the media interface that are mapped to native controls of the first selected website having the first media files; the server further configured to receive, by the media interface, an input to control the first media files and
communicate the input to the native controls of the first selected website, without accessing the native controls at the first selected website.

23. The system of claim 22, wherein the browser or a plugin of the browser is in communication with the server, during the communication, the server continuing to detect navigation to additional selected websites, and for each additional website, scanning the selected website to identify media files, and for each additional selected websites having media files generating the unified set of media controls for each respective additional audio tabs, wherein each of the additional audio tabs has associated tab rendering data, the browser, when associated with the audio tab and one or more additional audio tabs, includes program instructions for rendering the audio tab and the additional audio tabs to enable switching between the audio tab and the additional audio tabs and accessing media through the audio tab and the additional audio tabs via the unified set of media controls, without directly accessing the native controls of the respective websites.

\* \* \* \* \*